May 27, 1958 R. GRIFFITHS 2,836,692
TEMPERATURE DETECTORS
Filed April 28, 1955
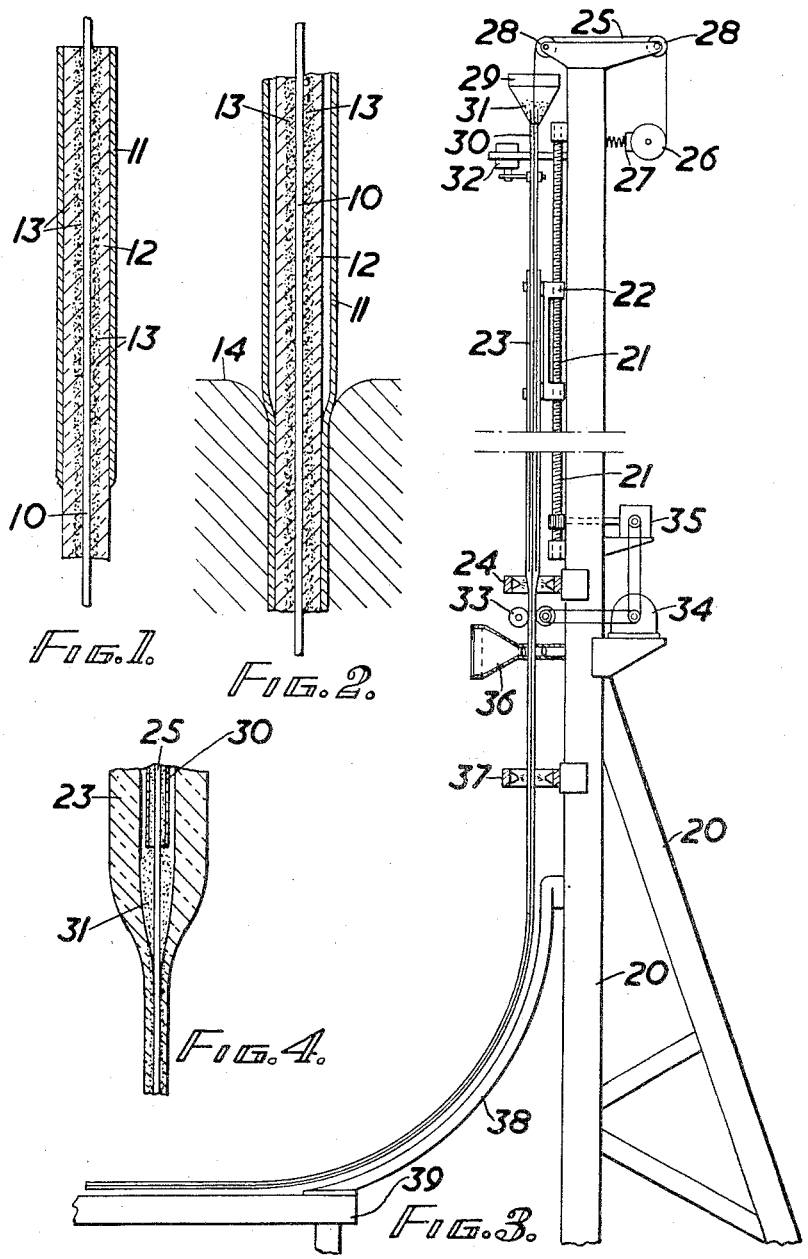
INVENTOR
Rupert Griffiths
BY John M. Mason
ATTORNEY

United States Patent Office 2,836,692
Patented May 27, 1958

2,836,692

TEMPERATURE DETECTORS

Rupert Griffiths, London, England, assignor of one-half to Graviner Manufacturing Company Limited, London, England, a British company, and one-half to Wilkinson Sword Limited, London, England, a British company Application April 28, 1955, Serial No. 504,630

3 Claims. (Cl. 201—63)

This invention relates to temperature detectors and to methods of manufacture thereof.

One particular use of temperature detectors constructed in accordance with the present invention is in aircraft, where they may be used for detecting the existence of a predetermined temperature, for example to indicate the presence of flame or of overheat conditions. Such detectors may also be used equally well for non-aircraft purposes.

According to the present invention thereis provided a temperature detector comprising two spaced electrical conductors the space between which contains a temperature sensitive material whose electrical resistance falls with rising temperature, said temperature sensitive material softening at elevated temperatures, said space also containing discrete particles of refractory material distributed therein for opposing movement together of said conductors when said temperature sensitive material is softened.

The invention also provides a temperature detector comprising two electrical conductors spaced apart by a temperature sensitive material whose electrical resistance varies appreciably with variations in temperature over a predetermined temperatrue range, said temperature sensitive material softening at elevated temperatures, the space between said conductors also containing discrete particles of a material which does not soften appreciably at said elevated temperautres, said particles serving to oppose movement of said conductors into contact with one another when said temperature sensitive material is in a softened condition.

The invention further provides a temperature detector comprising two electrical conductors separated by a glass-like substance whose electrical resistance falls substantially at temperatures at which detection is desired, the space between said conductors also containing discrete particles of a material which does not soften appreciably at temperatures at which said glass softens whereby said particles serve to oppose movement of said conductors into contact with one another when said glass is softened.

Whilst such a detector may be manufactured by various methods, one suitable method comprises fusing a tube of glass-like material progressively from one end whilst an elongated electrical conductor passing through the interior of the tube is moved relative to the fused portion of the tube to cause fused glass to be drawn from the tube to form a coating on the conductor, feeding said discrete particles into the interior of the tube whereby said particles are embedded in the glass-like coating formed on said conductor, and thereafter applying a second elongated electrical conductor to the outside of said glass-like coating.

For such methods of manufacture there may be provided apparatus comprising means for supporting the tube of glass-like material, means for fusing said tube, means for drawing an electrical conductor through the interior of said tube, means for moving said tube relative to said fusion source as fused material is drawn away on said conductor whereby the supply of fused glass is maintained, and means for supplying said discrete particles to the space betwen said tube and said electrical conductor.

A preferred construction of temperature detector in accordance with the present invention and methods of manufacture thereof will now be described, by way of example only, with reference to the accompanying diagrammatic drawings in which:

Figure 1 is a sectional side elevation of a small part of a completed detector;

Figure 2 shows the final stage in one method of manufacture of the detector;

Figure 3 is a side elevation, partly in section, of one form of apparatus for producing the detector, whilst Figure 4 is an enlarged cross-sectional view showing one stage of production of the detector.

In its preferred form as shown in Figure 1 the detector comprises an inner wire conductor 10, an outer conductive sheath 11, a filling of temperature sensitive material 12 and discrete particles 13 of refractory material embedded in the temperature sensitive material 12. Normally, a plug or socket fitting of any suitable form is provided at each end of the finished detector.

In this construction the temperature sensitive material 12 is glass, this term being intended to embrace all glass-like substances. Many different varieties of glass may be used in the detector provided that they possess the property that their electrical resistance is extremely high at low temperatures so that they are virtually a good insulating material, but have an electrical resistance which decreases with rising temperature and eventually falls to a relatively low value so that the glass is virtually a good electrical conductor. Detection is normally effected by applying a potential between the two conductors and utilising the passage of current between the two conductors, occurring at the predetermined temperature at which the resistance has fallen to a low value, to effect operation of a suitable indicator or warning device. The temperature versus resistance characteristic of such as glass is dependent upon its composition, so that by using an appropriate composition detection at a desired temperature may be obtained.

Examples of suitable glasses for this purpose are a soda glass known as "X8," a lead glass known as "L1," both these glasses being available from Messrs. Plowden and Thompson, and a glass sold by that same firm under the registered trademark "Kodial." Examples of materials which may be used for the inner conductor are an 80%–20% nickel-chromium alloy wire known as "Nichrome" or a borated copper-clad nickel-iron wire of the kind commonly used in electric lamp production, a stainless steel sheath being used for the outer conductor. Other materials which may be used for the conductors are wire and tube consisting of nickel-iron alloys, for example those known as "Nilo K" or "Nilo 50."

It is a requirement for aircraft detectors that they should be capable of withstanding a temperature in excess of one thousand degrees centigrade for several minutes, and still function correctly thereafter. At such temperatures the glass will become relatively soft, and there is a danger that the two conductors may move into contact and the detector will then be useless. It is in order to prevent, or at least reduce the likelihood of, contact between the two conductors that the discrete particles 13 of refractory material are provided in the space between the two conductors. Various materials may be used for this purpose, provided that they are sufficiently refractory not to soften appreciably at the maximum temperature which the detector is designed to withstand. One substance which we have found to be suitable for this purpose is alumina of the grade sold by The Turret Grinding Wheel Company under the designation "No. 120 grit."

In the manufacture of a detector having the form shown in Figure 1 it is quite possible by using a suitable fusion source to apply the glass coating, with the discrete particles therein, to the wire by manual movement of the wire relative to the fused glass. Thus the inner conductor may be threaded into a length of glass tubing and the refractory particles dispersed in the space between the glass tubing and the wire. The glass tubing is then heated progressively from one end to soften the glass whilst the wire is pulled through the glass tube to draw down the glass onto the wire. During the drawing down of the glass onto the wire the refractory particles become embedded in the glass. As indicated in Figure 1 this method results in the concentration of refractory particles being highest in the vicinity of the inner conductor, but such distribution is not an essential. By correctly relating the rate of fusion of the glass to the speed of relative movement between the wire and the glass, a substantially uniform coating of glass with the particles embedded therein can be formed. If a coaxial detector is to be produced the coated wire is then threaded into the outer conductive sheath 11 which is subsequently brought into intimate contact with the glass coating by any suitable reducing process; for example the sheath may be drawn down by passing it through one or more dies, such as the die 14 shown diagrammatically in Figure 2, or may be reduced by swaging or pressing. In order to ensure satisfactory contact between the glass and the inner conductor it may be necessary to re-fuse the coating on the wire after its initial formation, and the detector may again be heated during or after the application of the outer conductor in order to give better contact between that conductor and the glass coating.

By way of example only, it may be stated that detectors according to the invention have been made having an outside diameter of between 0.065 and 0.09 of an inch, the inner conductor being of No. 29 standard wire gauge.

It is clearly desirable to mechanise the above described method of manufacture of detectors, and whilst this can be done in different ways one suitable apparatus for the purpose is shown in Figure 3. This apparatus comprises a stand 20 which carries a lead screw 21 on which is mounted a carrier 22 for supporting the glass tube 23. Fixed below the end of the lead screw 21 is a fusion source 24, which may be gas fired. The inner conductor in the form of a wire 25 is drawn from a reel 26 which is tensioned by a spring loaded brake 27, the wire being carried over pulleys 28 at the top of the stand 20 and led down through a grit hopper 29 and a grit feed tube 30 which forms an extension of the hopper 29. The feed tube 30 lies within the glass tube 23 and terminates a little above the fusion source 24. The hopper 29 contains the refractory particles 31 which fall through the feed tube 30. To prevent jamming or sticking of the particles a vibrator 32 is connected to the tube 30 to vibrate it at a suitable frequency and low amplitude.

To start the manufacturing process the end of the glass tube 23 is fed into the fusion source 24, and when the end of the glass is fused the wire 25 is pulled downwards to draw down the fused glass onto the wire. Draw-off rollers 33 are then brought into engagement with the first portion of coated wire, the draw-off rollers 33 being driven from a motor 34 to continue the drawing down of the coated wire. As glass is drawn off by the wire from the end of tube 23 it is necessary to move the tube 23 downwards into the fusion source, and for this purpose the lead screw 21 is driven from the motor 34 via a variable ratio gear box 35 in order to move the carrier 22 downwards at an appropriate rate. As shown in Figure 4, which is an enlarged view of the tube 23 and wire 25 in the vicinity of the fusion zone, the diameter $d$ of the coating is very much smaller, for example approximately one sixth, of the diameter $D$ of the tube 23 so that the required speed of downward movement of the glass tube 23 is very much lower than the required speed of the coated wire. The ratio between the two speeds can be adjusted by means of the gear box 35 and the fact that both movements are effected from a common driving source helps to ensure an approximately constant coating thickness. If desired, an optical projection device 36 may be provided for giving a magnified image of the coating to allow visual monitoring which can be followed by adjustment of the apparatus if necessary.

If it is found necessary to re-fuse the coated wire to ensure wetting of the wire by the glass throughout its length, this can be achieved by providing a further fusion source 37 below the rollers 33. The coated wire is then directed by a suitable supporting guide 38 onto a bench 39 where it may be cut into suitable lengths. The guide should have a sufficiently large radius to prevent damage to the coated wire, the coating of which may not at this stage have solidified throughout. After the coated wire has been cut it may be sheathed by any suitable method, for example by the methods mentioned above. Of course, if desired the coated wire could be sheathed as it is drawn from the coating apparatus but no particular advantage can be seen in making this stage of the manufacture continuous with the previous stage.

Whilst the above description and drawings have referred specifically to a detector in which the two conductors are coaxial, it should be understood that the invention is not limited to this arrangement of the conductors, but that both conductors may be in the form of wires. After coating these wires with the glass, which has the refractory particles distributed therein, the coated wires may subsequently be introduced into an outer sheath which forms an envelope for the temperature sensitive material but does not function as a conductor. With this construction it may be desirable to pack further material into the sheath after the coated wires have been introduced, to fill any vacant space in the sheath.

What I claim is:

1. A temperature detector comprising an electrically conductive sheath, an inner electrical conductor located coaxially within said sheath, a non-porous glass filling within said sheath, said glass having an electrical resistance which falls with rising temperature, and discrete non-colloidal particles of a refractory material which remain solid at the softening temperature of said glass, said particles being fused in said glass and interposed between said conductor and said sheath in the vicinity of said inner conductor only.

2. A temperature detector according to claim 1 wherein the discrete non-colloidal particles are particles of alumina.

3. A temperature detector according to claim 1 wherein said electrical conductive sheath is tubular in form, said sheath, said glass filler, and said inner conductor being adapted for bending.

References Cited in the file of this patent

UNITED STATES PATENTS

| | | |
|---|---|---|
| 2,477,348 | Postal | July 26, 1949 |
| 2,566,335 | Joerren | Sept. 4, 1951 |
| 2,587,916 | Squier | Mar. 4, 1952 |
| 2,652,622 | Charbonneau | Sept. 22, 1953 |
| 2,677,172 | Oakley | May 4, 1954 |